United States Patent

Gross et al.

[11] 4,050,007
[45] Sept. 20, 1977

[54] CONTROL UNIT FOR THYRISTORS OF A CYCLOCONVERTER

[75] Inventors: Hans Gross, Neunkirchen a. Brand, Germany; Eugenio Berti, Milan, Italy

[73] Assignee: Siemens Aktiengesellschaft, Munich, Germany

[21] Appl. No.: 684,497

[22] Filed: May 10, 1976

[51] Int. Cl.² .......................................... H02M 7/155
[52] U.S. Cl. ........................................ 363/87; 363/161
[58] Field of Search ..................... 321/5, 40, 69 R; 307/252 UW, 252 E; 328/162, 165

[56] References Cited

U.S. PATENT DOCUMENTS

| | | | |
|---|---|---|---|
| 3,265,933 | 8/1966 | Perry et al. | 317/11 |
| 3,727,079 | 4/1973 | Garrett | 307/235 E |
| 3,852,654 | 12/1974 | Gyugyi et al. | 321/69 R X |
| 3,891,912 | 6/1975 | Watanabe | 321/40 X |

*Primary Examiner*—William M. Shoop
*Attorney, Agent, or Firm*—Kenyon & Kenyon, Reilly, Carr & Chapin

[57] ABSTRACT

A control unit for the thyristors of a cycloconverter is disclosed. The thyristors are supplied by a three phase network and the control unit is also responsive to such network. In particular, in the control unit a measuring voltage is derived from a phase voltage, and phase-shift means and smoothing means are provided to shift the phase of the measuring voltage so that its zero crossing is in the vicinity of the zero crossing of a phase voltage. The phase-shifted measuring voltage is then fed to a sawtooth integrator which generates a sawtooth voltage in dependence on the zero crossing of the applied phase-shifted measuring voltage. The sawtooth voltage is then used to generate firing commands for the thyristors.

2 Claims, 3 Drawing Figures

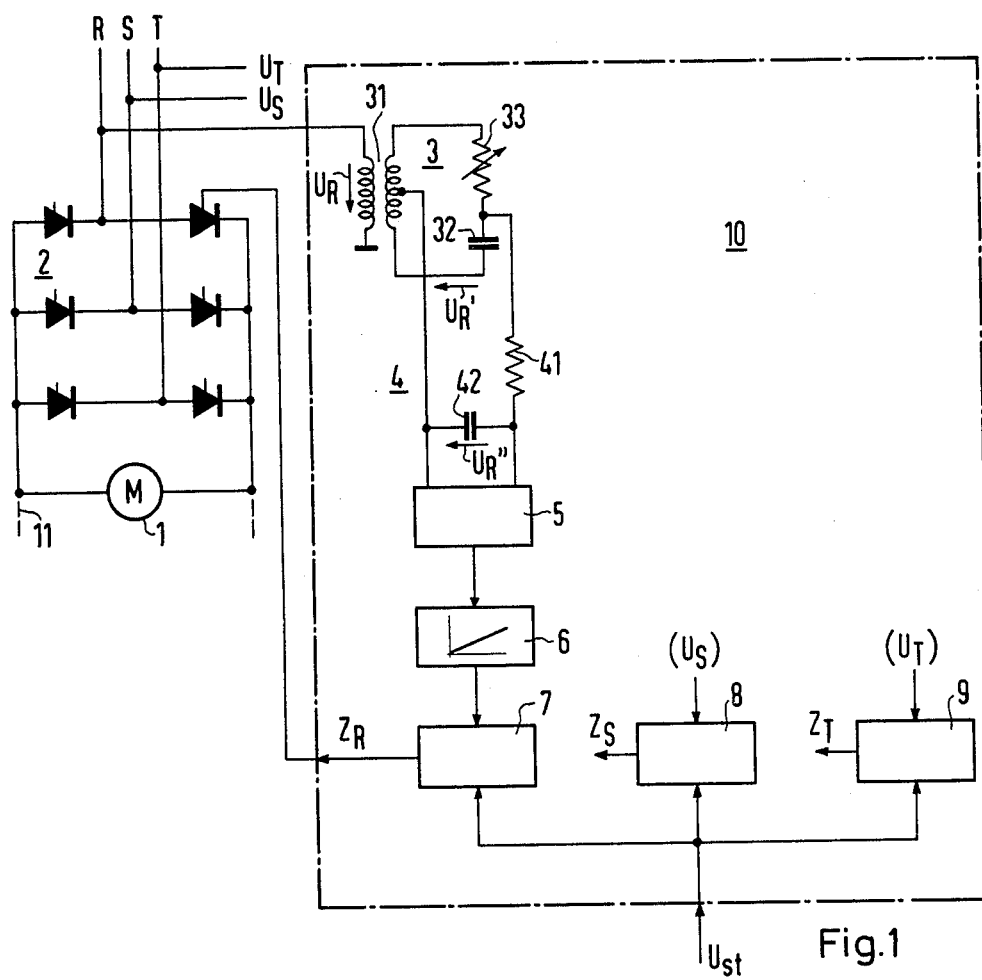
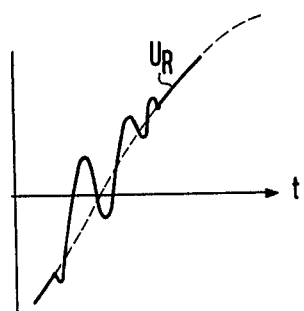
Fig.2
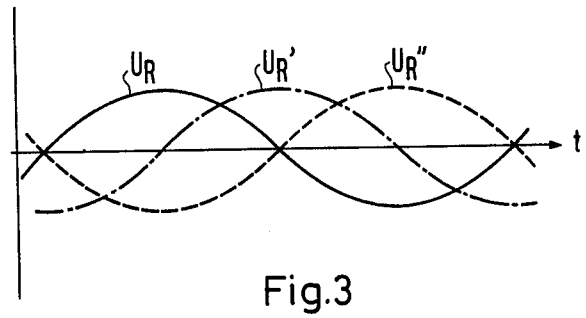
Fig.3

CONTROL UNIT FOR THYRISTORS OF A CYCLOCONVERTER

FIELD OF THE INVENTION

The invention relates to a control unit for thyristors supplied by a three-phase network and forming part of a cycloconvertor.

BACKGROUND OF THE INVENTION

Control units of the above type are known in which the phase voltage is used to generate a sawtooth voltage in dependence on the zero crossing of the phase voltage. The generated sawtooth voltage is then compared with a control voltage and, if in agreement therewith, a firing command for the thyristors is generated. Such a control unit is described, for example, in the German Auslegeschrift No. 2,119,525.

In the aforesaid control units, a problem arises in determining the exact location of the zero crossing of the phase voltage, as this voltage frequently contains harmonics. If the phase voltage is smoothed in order to filter out the harmonics, the smoothing is then accompanied by a phase shift. The better the smoothing, the larger will be the phase shift and, therefore, the displacement of the zero crossing. Since the firing command may have to be given shortly after the zero crossing of the voltage to be controlled, e.g., after 30° el, only relatively little smoothing is possible, if a defined zero crossing is to be obtained prior to the required start of firing. For more smoothing, the zero crossing of another phase must be used in three-phase circuits. The uncertainty in the determination of the zero crossing connected therewith is often undesirable from a control-engineering point of view, especially if highly precise motor controls in machine tool design, for example, are involved.

It is an object of the present invention to provide an improved control unit of the above type.

SUMMARY OF THE INVENTION

In accordance with the principles of the present invention, the above and other objectives are accomplished in a control unit of the above type by including therein a phase-shift means and smoothing means for shifting the phase of the derived measuring voltage so that its zero crossing is in the vicinity of the zero crossing of a first phase voltage. The aforesaid zero crossing is then used as a reference point for the start of a sawtooth integrator whose output is employed for deriving the firing commands for the thyristors during the next successive half wave of the first phase voltage. In this manner, the measuring voltage can be smoothed as much as desired while obtaining an exactly defined zero crossing.

A relatively simple circuit for the phase-shift means and smoothing means is provided by a phase-shift bridge, which is inductively coupled to the phase voltage, and by a smoothing member coupled to the bridge.

BRIEF DESCRIPTION OF THE DRAWINGS

The above and other features and aspects of the present invention will become apparent upon reading the following description in conjunction with the accompanying drawings, in which:

FIG. 1 shows a block diagram of a control unit in accordance with the principles of the present invention;

FIG. 2 shows one of the phase voltages feeding the control unit of FIG. 1; and

FIG. 3 shows the relationship between one of the phase voltage feeding the circuit of FIG. 1 and certain voltages generated in the circuit.

DETAILED DESCRIPTION

In FIG. 1, a d-c motor 1 is connected to a three-phase network R, S, T via a three-phase bridge circuit 2 having thyristors in its bridge branches. As indicated by the dashed lines 11, a further three-phase bridge may be provided for rotation of the motor 1 in the opposite direction. A control unit 10 is providing for driving the thristors of the bridge circuit 2. The unit 10 is synchronized with the zero crossings of the phases R, S, T and provides firing commands to the individual thyristors depending on the amplitude of the control voltage $U_{st}$.

In accordance with the present invention novel means is provided for determining the zero crossings of the phase voltages so as to permit the control unit to be synchronized thereto. More particularly, a measuring voltage $U_R$, which is proportional to the voltage of the phase R, is derived and coupled to the primary winding of the transformer 31, the secondary winding of which forms part of a phase-shift bridge 3. The output voltage $U_R'$ of the phase-shift bridge 3 is taken from between the center tap of the secondary winding of the transformer 31 and the divider point between the potentiometer 33 and the capacitor 32 of the bridge. As can be appreciated by appropriate selection of the potentiometer divider point, the phase-shift between the bridge input and output voltages $U_R$ and $U_R'$ can be set at any angle between 0° to 180°.

The output voltage $U_R'$ of the bridge is fed to a smoothing member 4, which comprises a resistor 41 and a capacitor 42 and which again causes an additional phase-shift. In the present illustrative case the phase-shift bridge 3 and the smoothing member are matched in such a manner that the voltage $U_R''$ appearing at the output of the smoothing member is shifted about 180° el relative to the input voltage $U_R$. Alternatively, the bridge and smoothing member may be set so that a phase-shift greater than 180° is obtained.

The smoothed measuring voltage $U_R''$ is fed to a multivibrator 5 which is designed to trigger at the zero crossing of the voltage. Upon being triggered the multivibrator 5 initiates operation of a sawtooth integrator 6. The output from the integrator 6 is then compared in a comparator 7 to a set control signal $U_{st}$. If the sawtooth signal has reached $U_{st}$, a firing command signal $Z_R$ for the thyristors of the three-phase bridge 2 which are associated with the phase R is generated The additional pulse amplifiers and other circuitry required for generating the signal $Z_R$ have been omitted herein for the sake of simplicity.

The respective firing command signals $Z_S$ and $Z_T$ for the other two phase S and T are obtained in an analagous manner as the signal $Z_R$ from their respective phases and appear at the outputs of comparator members 8 and 9, respectively. It should also be noted that the respective firing commands signals corresponding to a particular phase may be derived from another phase, e.g., the phase T may be used to derive the voltage $Z_R$. This can be accomplished by appropriate adjustment of the potentiometer 33.

As can be seen from FIG. 2, the line voltage $U_R$ contains heavy harmonics (as do the line voltages $U_S$ and $U_T$) and, therefore, does not yield an exactly defined zero crossing. The smoothed voltage $U_R''$, on the other hand, has a clearly defined zero crossing for initiating operation of the sawtooth integration in the phase R.

The circuit of the invention can be adapted for use with other line frequencies, e.g., 60Hz, by means of jumpers.

What is claimed is:

1. A control unit for thyristors of a cycloconverter, the thyristors being adapted to be connected to a three phase network generating three phase voltages, the control unit comprising:

means for deriving a measuring voltage from a phase voltage, said means for deriving comprising a transformer having a primary winding adapted to be responsive to a phase voltage and a secondary winding having a tap;

phase-shift means for phase-shifting said measuring voltage, said phase-shift means shifting the phase of said measuring voltage by a first amount which compensates for the phase shift of said measuring voltage relative to said phase voltage by a second amount, said second amount of phase shift being applied to said measuring voltage by passage of said measuring voltage through a smoothing means, said phase-shift means comprising:

said secondary of said transformer;

a series connection of a capacitor and potentiometer;

and smoothing means for smoothing said measuring voltage, said smoothing means being connected between said capacitor and said potentiometer, said smoothing means shifting the phase of said measuring voltage by said second amount.

2. A control unit in accordance with claim 1 further including:

means for generating a firing command for said thyristors including integrator means responsive to said measuring voltage after said measuring voltage has been smoothed and phase-shifted by said first and second amounts for generating a sawtooth voltage in dependence on the zero crossings of said measuring voltage.

* * * * *